March 22, 1966   J. C. McLEAN   3,241,355
ACCELEROMETER CALIBRATION MEANS
Filed May 31, 1963
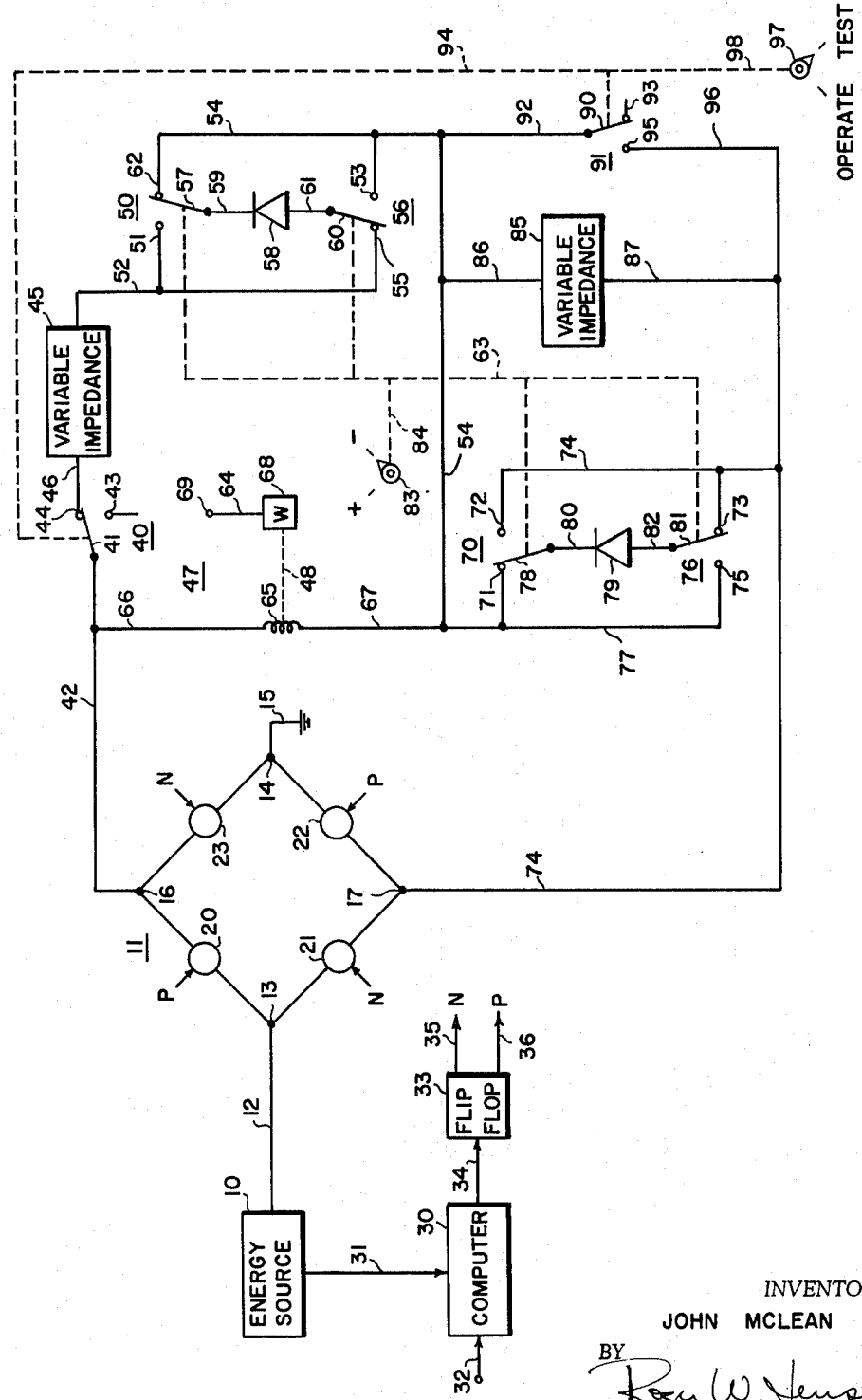
INVENTOR.
JOHN MCLEAN
BY
ATTORNEY United States Patent Office 3,241,355
Patented Mar. 22, 1966

3,241,355
ACCELEROMETER CALIBRATION MEANS
John C. McLean, Largo, Fla., assignor to Honeywell Inc.,
a corporation of Delaware
Filed May 31, 1963, Ser. No. 284,721
4 Claims. (Cl. 73—1)

The present invention pertains to apparatus for simulating a force and more specifically to apparatus for testing the electronic circuitry in a force rebalance system such as the torque generator of an inertial sensor an example of which is an accelerometer or a gyroscope.

In prior art devices an actual force or acceleration of variable magnitude is applied to the force rebalance system or inertial sensor to test the associated electronic circuitry. This necessitates a great amount of additional equipment and thereby greatly increase the errors.

In this preferred embodiment the associated electronic circuitry applies a continuous series of equal pulses of current to the control winding of the torque generator in an inertial sensor. If the inertial sensor has no accelerational forces applied to it the sensor is at the null position. The pulses applied to the control winding alternate in polarity and the sensor oscillates about the null position, since pulses of one polarity cause movement in a first direction and pulses of an opposite polarity cause movement in the opposite direction. If the inertial sensor deviates from the null position in either direction one polarity of pulses will predominate until the inertial sensor again reaches its null position. It should be noted that this system of pulse torquing is simply utilized for explanational purposes and the type of force rebalance system explained is not intended to limit this invention in any way.

In the present invention, a passive network is placed in series-parallel with the control winding of the torque generator for the inertial sensing device. When a rebalance current of a first polarity is applied to the control winding of the torque generator in combination with the passive network, all of the current travels through the control winding in a first direction. When a rebalance current having a polarity opposite to the first polarity is applied to the control winding a portion of the current traveling in the second direction is shunted around the control winding. Since the inertial sensor will only return to null when the time integral of current applied to the control winding in the first direction is equal to the time integral of current applied to the control winding in the second direction, when the passive network is added, the associated electronic circuitry will have to provide more current in a given period of time in the second direction than was applied in the first direction to return the inertial sensor to the null position.

In the pulse torquing system the addition of the passive network to the control winding of the torque generator causes the associated electronic circuitry to provide more pulses of a second polarity than of a first polarity to maintain the inertial sensor oscillating about the null position, as already explained. Since there are a majority of pulses in the second direction the associated electronic circuitry will function as through an acceleration is being applied to the inertial sensor in a direction corresponding to that polarity of pulses.

The amount of current shunted around the control winding of the torque generator can be controlled by varying the components of the passive network. The control of the magnitude of this shunt current controls the amount of apparent acceleration applied to the inertial sensor. This current can be varied from zero current, which would indicate zero acceleration on the inertial sensor, to all of the rebalance current applied in the given direction, which would indicate a maximum acceleration on the inertial sensor.

Accordingly, it is an object of this invention to provide an improved control apparatus.

Another object of this invention is to provide means for electrically simulating an acceleration on an inertial sensor.

Another object of the present invention is to provide electrical means for electrically simulating a force to test a force rebalance system.

These and other objects of the present invention will be understood upon consideration of the accompanying specification, claims and drawing of which the figure is a somewhat schematic diagram of a force rebalance system in combination with the present invention.

In the figure the numeral 10 designates an energy source which may be for example pulse producing means or a constant current source. Energy source 10 is connected to a bridge circuit 11 by means of a lead 12. Lead 12 is connected to an energization terminal 13 of bridge circuit 11. The other energization terminal is designated 14 and is connected to ground by means of a lead 15. Bridge circuit 11 has two output terminals 16 and 17. A switch 20 is connected between energization terminal 13 and output terminal 16 in one leg of the bridge circuit 11. In this preferred embodiment switch 20 is a semiconductor switch which is energized by a signal on switching input lead designated P. A switch 21 is connected between energization terminal 13 and output terminal 17 in a second leg of bridge circuit 11. Switch 21 is energized by a signal appearing on a switching input lead designated N. A switch 22 is connected between energization terminal 14 and output terminal 17 in a third leg of bridge circuit 11. Switch 22 is energized by a signal appearing on a switching input lead designated P. A switch 23 is connected between energization terminal 14 and output terminal 16 in a fourth leg of bridge circuit 11. Switch 23 is energized by a signal appearing on a switching lead designated N. The switching input leads of switches 20 and 22 are both designated P and the switching input leads of switches 21 and 23 are both designated N because these switches are energized simultaneously and by the same input signal.

A computer 30 is connected to receive an input signal on a lead 31 from energy source 10. Computer 30 also receives an input signal on a lead 32 from circuitry not shown. The circuitry connected to lead 32 would include means for indicating when the force rebalance system is to provide a force and the direction of that force. This circuitry is not shown since it is not a part of this invention. A signal from computer 30 is applied to a flip flop circuit 33 by means of a lead 34. Flip flop circuit 33 has two output leads designated 35 and 36. Lead 35 also is designated N to indicate that it connects to the switching input leads of switch 21 and switch 23, also designated N. Lead 36 is designated P to indicate that it connects to the switching input leads of switch 20 and switch 22, also designated P. These are all direct connections but have been eliminated in this figure for simplicity. A more complete description of the typical pulse torquing system briefly described herein may be found in the copending application of Landy et al., filed April 6, 1962, Serial No. 185,623, and assigned to the same assignee. It should be understood that this example of a pulse torquing system is simply used for explanational purposes and that the present invention can be utilized with many other systems.

The movable arm 41 of a switch 40 is connected to output terminal 16 of bridge circuit 11 by means of a lead 42. Switch 40 has a pair of contacts 43 and 44 one of which is always in contact with movable arm 41. Contact 43 has no leads connected to it and is utilized simply to provide a means for opening the circuit by switching movable arm 41 into contact with it. Contact 44 is connected to one side of a variable impedance 45 by means of a lead 46. The other side of impedance 45 is connected to a first contact 51 of a switch 50 by means of a lead 52. Lead 52 also connects impedance 45 to a first contact 55 of a switch 56. A second contact 62 of switch 50 is connected to a second contact 53 of switch 56 by means of a lead 54. A movable arm 57 of switch 50, which engages either first contact 51 or second contact 62 of switch 50, is connected to one side of a diode 58 by means of a lead 59. The other side of diode 58 is connected to a movable arm 60 of switch 56 by means of a lead 61. Movable arm 60 of switch 56 engages either first contact 55 or second contact 53 of switch 56. Diode 58 is connected between movable arm 57 and movable arm 60 so that current will flow from arm 60 to arm 57. Arm 57 and arm 60 are mechanically connected together as indicated by dotted line 63, and operated simultaneously so that arm 57 is engaging contact 62 when arm 60 is engaging contact 55, and arm 57 is engaging contact 51 when arm 60 is engaging contact 53.

An inertial instrument, which may be an accelerometer or a gyroscope, is schematically shown in the figure and indicated by the numeral 47. Briefly, a member or weight 68 is supported for movement relative to an axis 69 by a shaft 64. A control winding 65 reacts, when energized, upon the weight 68 to maintain it at approximately the null position. The reaction of control winding 65 upon weight 68 is shown as a mechanical connection by dotted line 48. A more complete description of a typical inertial instrument which may be utilized is disclosed in Patent 2,853,287, issued to C. S. Draper et al., September 23, 1958. One side of control winding 65 is connected to lead 42 by means of a lead 66. The other side of control winding 65 is connected to lead 54 by means of a lead 67. Thus, when the arm 41 of switch 40 is engaging contact 44, impedance 45 and diode 58 which are in series, are connected in parallel with control winding 65. Switches 50 and 56, which are mechanically connected together, operate to change the direction of current flow through the parallel circuit, by reversing the connection of diode 58 in the circuit.

Lead 67 is also connected to a first contact 71 of a switch 70. A first contact 75 of a switch 76 is connected to lead 67 by means of a lead 77. A second contact 72 of switch 70 is connected to a second contact 73 of switch 76 by means of a lead 74. A movable arm 78 of switch 70 is connected to one side of a diode 79 by means of a lead 80. The other side of diode 79 is connected to a movable arm 81 of switch 76 by means of a lead 82. Diode 79 is connected between movable arms 78 and 81 so that current will flow from arm 81 to arm 78. Arms 78 and 81 are mechanically connected together, as indicated by the dotted line 63, so that they operate simultaneously. When arm 78 is engaging contact 71, arm 81 is engaging contact 73 and when arm 78 is engaging contact 72, arm 81 is engaging contact 75. Thus, the connection of diode 79 in the circuit is reversed when switches 70 and 76 are operated. Arms 78 and 81 are also mechanically connected to arms 60 and 57 as indicated by dotted line 63. All four of the movable arms 57, 60, 78 and 81 operate simultaneously and move from the contacts 62, 55, 71 and 73, respectively, which they are shown engaging in the figure, to the opposite contacts 51, 53, 72 and 75 respectively when the diode reversing switches 50, 56, 70 and 76 are operated. The diode reversing switches are illustrated as being operated by a manual knob 83 having two positions designated + and − to indicate positive or negative acceleration. Manual knob 83 is mechanically linked to the linkage mechanically connecting the diode reversing switches, as illustrated by dotted line 84.

One side of a variable impedance 85 is connected to lead 54 by means of a lead 86. The other side of variable impedance 85 is connected to lead 74 be means of a lead 87. Lead 74 connects contact 72 of switch 70 and contact 73 of switch 76 to the output terminal 17 of bridge circuit 11.

A first contact 93 of a switch 91 has no leads connected thereto and is utilized to provide an open circuit. A movable arm 90 of switch 91 is connected to lead 54 by a lead 92. Movable arm 90 of switch 91 is mechanically connected to movable arm 41 of switch 40. This mechanical connection is illustrated by a dotted line 94. Switches 40 and 91 may be operated simultaneously by a manual knob 97. Manual knob 97 has two positions designated "operate" and "test" and is mechanically connected to the switches as illustrated by dotted line 98. The arms 90 and 41 are connected so that when movable arm 41 engages contact 44 of switch 40, movable arm 90 engages contact 93 of switch 91. A second contact 95 of switch 91 is connected to lead 87 by a lead 96. When arm 90 is engaging contact 95 of switch 91 the impedance 85 and diode 79 are shorted out of the circuit.

*Operation*

To explain the operation of this invention it will be assumed that the device to be rebalanced is a pendulous accelerometer and coil 65 is the control winding of a torque generator thereof which operates in conjunction with the pendulum and causes a force thereon. It should be noted that this example is simply for explanational purposes and is not intended to limit this invention in any way.

When the force rebalance circuit is in the normal operating position the arm 41 of switch 40 is engaging contact 43. Assuming that a signal appears on output lead 36 of flip flop circuit 33, the trigger input lead p of switch 20 and 22 have a signal thereon causing these switches to appear to have zero resistance. Simultaneously, the trigger input lead N has no signal thereon and switches 21 and 23 have a very high resistance to current flow. A current path is then provided from energy source 10 through lead 12, switch 20, and lead 42 to control winding 65. No current will travel through the switch 40 since the arm 41 is engaging contact 43 in the operate position. The current path from control winding 65 is completed through leads 67, 54, and 92 to arm 90 and contact 95 of switch 91, lead 96, lead 74, switch 22 and lead 15 to ground. If computer 30 causes flip flop circuit 33 to produce a signal on lead 35 the trigger input leads N will be energized and switches 21 and 23 will appear to have low resistance (while switches 20 and 22 have a very high resistance) completing a circuit from energy source 10 through control winding 65 in a direction opposite to the path just described.

In the present embodiment flip flop circut 33 is continually oscillating when the pendulous accelerometer has no acceleration applied thereto. Thus, current from energy source 10 travels through control winding 65 first in one direction and then the other in a continuous series of square waves. Over a period of time the number of pulses of current that travel through control winding 65 in one direction will be equal to the number of pulses of current that travel through control winding 65 in the other direction. This is an indication that the pendulum of the accelerometer is oscillating about null and no acceleration is being applied to the accelerometer.

When the switches 40 and 91 are placed in the test position, which is when arm 41 is engaging contact 44 and arm 90 is engaging contact 93 as shown in the figure, the series circuit of variable impedance 45 and diode 58 is placed in parallel with the control winding 65. Also, the parallel circuit of the variable impedance 85 and the diode 79 is placed in series with the previously mentioned parallel circuit. As already explained, diode reversing switches 50, 56, 70 and 76 have two positions, the — position being that depicted in the drawing when arm 57 is engaging contact 62, arm 60 is engaging contact 55, arm 78 is engaging contact 71 and arm 81 is engaging contact 73. When these switches are in the — position and flip flop circuit 33 provides a signal for the trigger input leads designated N, current flows from the output terminal 17 through diode 79 and control winding 65 to output terminal 16. It should be noted that diode 79 provides substantially zero resistance for the current in this direction while diode 58 provides an extremely high resistance, thus the total current applied by energy source 10 flows through the control winding.

With the diode reversing switches in the — position, when flip flop circuit 33 switches to provide a signal on the trigger input leads designated P, current flows from the output terminal 16 through control winding 65 and also through the parallel path provided by variable impedance 45 and diode 58. The total current then flows through variable impedance 85 and to the other output terminal 17. In this instance, only a portion of the current produced by energy source 10 will flow through the control winding 65. Since all of the current will flow through control winding 65 on the first pulse but only a porion of the current flows back through control winding 65 on the second pulse, the force rebalancing means will produce more force from the first pulse than from the second pulse and an unbalance or apparent external force occurs. The amount of unbalance or apparent external force can be varied by varying the impedances 45 and 85.

Variable impedance 45 can be varied continuously from zero impedance, at which point the apparent acceleration on the accelerometer is a maximum, to several times the value of control winding 65, at which point very little current is shunted through variable impedance 45 and the apparent acceleration is very small. As impedance 45 is varied from a maximum to a minimum, impedance 85 must be varied from a minimum to a maximum. Variable impedances 45 and 85 may be varied simultaneously by connecting them both to the same shaft or they may be varied separately. In practice each impedance could have a dial thereon precalibrated in units of acceleration and the device would be prepared for test by simply placing both dials at the acceleration which it is desired to simulate. Variable impedance 45 and variable impedance 85 are selected and adjusted so that the total impedance between output terminals 16 and 17 remains constant at all times. By maintaining the impedance betwen output terminals 16 and 17 constant at all times, the load on energy source 10 is constant and variations in the output due to variations in the load do not occur.

Assume for example that variable impedance 45 is set at the same value as the impedance of control winding 65. Variable impedance 85 will be set at one-half the value of the impedance of control winding 65. When flip flop 33 provides a signal on the trigger leads designated P, half of the current flowing from output lead 16 will flow through control winding 65 and half of the current will flow through the variable impedance 45. Since these two impedances are in parallel the total impedance is one-half of the original value of control winding 65. Thus, the variable impedance 85, which is set at one-half the original value of control winding 65, adds to the parallel combination of control winding 65 and the variable impedance 45 to maintain the total impedance between terminals 16 and 17 constant.

Also, since only one-half of the current flowing from output terminal 16 flows through control winding 65 to output terminal 17 and since all of the current flowing from terminal 17 to terminal 16 flows through control winding 65, approximately twice the time integral of current will have to be supplied by energy source 10 in the first direction or polarity to maintain the pendulum of the accelerometer at the null position. Since there is twice the time integral of current applied to the output terminals 16 and 17 in the first direction as there is in the second direction, the electronic circuitry associated with the force rebalance device acts as though an acceleration is being applied to the weight 68 of the pendulous accelerometer.

By placing diode reversing switches 50, 56, 70 and 76 in the second or positive position, that is arms 57, 60, 78 and 81 touching contacts 51, 53, 72 and 75 respectively, the current in the opposite direction of that previously explained will be shunted around control winding 65 and the associated electronic circuitry will act as though an acceleration of the opposite direction is being applied. Thus, apparatus is disclosed for effectively testing a force rebalance system for any magnitude and direction of force. The present invention is relatively simple to construct and operate and is much more accurate than the utilization of additional apparatus to provide an actual acceleration or force since there is less equipment to produce errors.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In an inertial instrument having a force rebalance system wherein a member is supported for movement relative to an axis including force means which when energized by a voltage of a first polarity tend to move the member in a first direction with respect to the axis and when enrgized by a voltage of a second polarity tend to move the member in a second direction with respect to the axis: acceleration simulating means including a first variable impedance means connected in parallel with said forcing means for reducing the effect of the first voltage on the force means and including a second variable impedance means for maintaining the total impedance of the force means and the acceleration simulating means substantially constant.

2. Apparatus of the class described comprising: an inertial instrument having rebalance means connected thereto; pulse producing means; means connecting said pulse producing means to said rebalance means in a first polarity for a first direction of movement and in a second polarity for a second direction of movement; means including variable impedance means for varying the energy in said pulses of said first polarity to simulate a force on said instrument; and means for maintaining a substantially constant load impedance across said pulse producing means.

3. Apparatus of the class described comprising: force rebalance means; a constant current source; switching means connecting said constant current source to said rebalance means in a first polarity for a first direction of movement; means including a variable impedance by-pass circuit for varying the effect on said rebalance means of the current in said first polarity; and means for maintaining a substantially constant load impedance across said contsant current source as said bypass circuit impedance is varied.

4. Apparatus of the class described comprising: an inertial instrument having rebalance means connected thereto; series means comprising first diode means connected in series with a first variable resistance means; means connecting said series means in parallel with said rebalance means; parallel means comprising second diode means connected in parallel with second variable resistance means; means connecting said parallel means in series with said rebalance means; a constant current source; and switching means connecting said constant current source to said series means and said rebalance means in a first polarity for a first direction of movement and in a second polarity for a second direction of movement, said first diode means being connected to conduct current of said first polarity and said second diode means being connected to conduct current of said second polarity.

References Cited by the Examiner

UNITED STATES PATENTS

| | | | |
|---|---|---|---|
| 2,923,904 | 2/1960 | Hieber | 73—1 |
| 2,940,306 | 6/1960 | Lozier | 73—71.2 |
| 3,120,622 | 2/1964 | Dranetz et al. | 73—1 |

LOUIS R. PRINCE, *Primary Examiner.*

S. C. SWISHER, *Assistant Examiner.*